United States Patent
Dyer

(10) Patent No.: US 12,181,777 B1
(45) Date of Patent: Dec. 31, 2024

(54) AESTHETIC CAMERA HOUSING

(71) Applicant: Mark Dyer, Graham, NC (US)

(72) Inventor: Mark Dyer, Graham, NC (US)

(73) Assignee: MSD Racing, LLC, Graham, NC (US)

( * ) Notice: Subject to any disclaimer, the term of this patent is extended or adjusted under 35 U.S.C. 154(b) by 245 days.

(21) Appl. No.: 17/812,500

(22) Filed: Jul. 14, 2022

(51) Int. Cl.
    *G03B 15/03*     (2021.01)
    *G03B 17/02*     (2021.01)
    *H04N 23/51*     (2023.01)

(52) U.S. Cl.
CPC ............ *G03B 15/03* (2013.01); *G03B 17/02* (2013.01); *H04N 23/51* (2023.01)

(58) Field of Classification Search
None
See application file for complete search history.

(56) References Cited

U.S. PATENT DOCUMENTS

| | | | | |
|---|---|---|---|---|
| 6,151,065 A * | 11/2000 | Steed | .................... | G08B 15/001 |
| | | | | 348/E7.086 |
| 9,150,165 B1 * | 10/2015 | Fortin | ..................... | B60R 11/04 |
| 10,960,987 B1 * | 3/2021 | Colson | .................. | B64D 45/00 |
| 11,371,688 B1 * | 6/2022 | Tian | ....................... | F21V 23/003 |
| 2006/0279631 A1 * | 12/2006 | Badalian | ............... | G08B 15/001 |
| | | | | 348/148 |
| 2009/0201413 A1 * | 8/2009 | Fishman | ................ | H04N 7/181 |
| | | | | 348/373 |
| 2013/0189456 A1 * | 7/2013 | Verbeyst-Hayes | .... | B60R 13/005 |
| | | | | 428/31 |
| 2013/0215271 A1 * | 8/2013 | Lu | ........................... | B60R 11/04 |
| | | | | 348/148 |

OTHER PUBLICATIONS

Amazon listing for "Pair C2 C3 & 2014-2019 C7 Corvette Stingray Sting Ray Fender Emblems 3D Badge Nameplate with Corvette", Date First Available for sale on May 10, 2020. (Year: 2020).*

* cited by examiner

*Primary Examiner* — Rodney E Fuller
(74) *Attorney, Agent, or Firm* — Tuggle Duggins P.A.; Blake P. Hurt; Reinier R. Smit

(57) ABSTRACT

An aesthetic camera housing including a base and a mount. The base and mount each define one or more fastener holes sized and shaped to accept a fastener. The base defines a camera channel with two openings positioned proximate the rear and bottom surfaces and the mount defines a camera hole through its top and bottom surface. When the bottom surface of the base and the top surface of the mount are flush with one another, the camera channel and mount camera hole are in fluid communication with each other, and a camera can be inserted therein. The fastener holes of the base and mount are in fluid communication allowing the base and mount to be fastened together. The base also includes an aesthetically pleasing feature. The mount is formed from a transparent material and retains a LED within whose light penetrates the mount and also increases aesthetic appeal.

16 Claims, 8 Drawing Sheets

AESTHETIC CAMERA HOUSING

FIELD OF THE INVENTION

The disclosure herein pertains to vehicle parts and accessories, and more particularly to aesthetically pleasing, custom vehicle parts and accessories that are functional.

DESCRIPTION OF THE PRIOR ART AND OBJECTIVES OF THE INVENTION

The restoration of classic vehicles such as automobiles is as popular as ever. Even the most amateur automobile enthusiast has an opinion on whether a classic car should be restored to its former glory by using all or mostly original factory parts for the interior and exterior (i.e. restoration) or if the exterior is mostly maintained but with the interior getting a significant upgrade in terms of technology, comfort, and safety (i.e. restomod). Both pathways have their own merits, but restomod is becoming an increasingly more appealing option to many due to the cost or scarcity of original and replicated original parts for many of the older cars and the desire to exercise a greater degree of control over the finished product.

The increased frequency of restomod projects has created a market for functional car accessories that are designed to increase both the aesthetic appeal of the vehicle and provide much needed technological upgrades to older models of cars. One upgrade that is often requested when "restomoding" older models of cars is to install video cameras to serve as rear or side view mirrors because older models of vehicles typically are equipped with inferior mirrors or no mirrors at all. These mirrors are configured to be attachable or permanently affixable to the exterior of a vehicle. Mirrors or video cameras may be installed in multiple locations on the exterior surface of a car such as the side, front, rear, underbelly, or roof. Some mirrors or video cameras can even be placed in the interior of cars. These video cameras may provide the driver and passengers with real time footage of the conditions of the environment around the vehicle which can aid the driver and passengers in navigation and safety.

The present disclosure relates to an aesthetic pleasing camera housing including a mount and a base, the mount defining a plurality of holes, is formed from a substantially transparent material, like glass or a different transparent and deformable solid, that may be adapted to conform with the unique contours of specific models of vehicles; one of the holes configured to receive an LED and wiring while the remaining holes are configured to receive a fastener therein. The base defines a plurality of holes and a channel, with the holes configured to receive a camera wiring and a fastener therein. Additionally, the base carries or defines an aesthetically pleasing feature. As used in this context, the aesthetically pleasing feature is customizable to suit the aesthetic preferences of the user or be aesthetically harmonious with a specific model of vehicle. While prior aesthetic camera housings can be installed to increase the technological offerings of older vehicles, they fail to be cohesive with, or customizable to the aesthetics of older models of vehicles, clashing with the aesthetics which may decrease the fair market value of the vehicle and the subjective value to the beholder. In addition to clashing with the aesthetics, prior aesthetic camera housings also contribute a significant amount to the overall aerodynamic drag of an automobile and are prone to vibration as a result of their geometry and orientation, which decreases the overall quality of the video feed to the user of the vehicle.

Thus, in view of the problems and disadvantages associated with prior art devices, the present disclosure was conceived and one of its objectives is to provide an aesthetic camera housing that is installable onto older models of cars.

It is another objective of the present disclosure to provide an aesthetic camera housing that includes a feature that is customizable in size and shape to be aesthetically harmonious with a predetermined model of car.

It is still another objective of the present disclosure to provide an aesthetic camera housing that is installable onto a side portion of a vehicle to provide the driver and passengers of a car with real time video footage of the surrounding area and promote informed driving decisions.

It is another objective of the present disclosure to provide an aesthetic camera housing to provide the driver and passengers of a car with real time video footage that is clearer, more reliable, and more stable than other camera housings known in the art.

It is yet another objective of the present disclosure to provide an aesthetic camera housing with a mounting portion that is deformable or customizable to fully embrace the contours and imperfections of a side of a car.

It is a further objective of the present disclosure to provide an aesthetic camera housing that also can be mounted to a top, rear, hood, or underbelly portion of a vehicle so as to provide real time video footage of the surrounding area near certain points of interest in and around the vehicle.

It is still a further objective of the present disclosure to provide an aesthetic camera housing that has a base portion with a feature that may take the shape of fish, mammals, reptiles, birds, insects, arachnids, letters of the alphabet, a gryphon, a phoenix, a trident, a wing, a crown, a watercraft, and/or a predetermined geometric shape.

It is yet a further objective of the present disclosure to provide an aesthetic camera housing with an LED and a transparent mounting portion so that the light emitted from the LED penetrates the mounting portion and is viewable by an observer regardless of the viewing angle.

It is still a further objective of the present disclosure to provide an aesthetic camera housing with an LED and a transparent mounting portion so that the light emitted from the LED penetrates the mounting portion and is viewable by an observer and alerts the observer that the vehicle is making a turn or driving in reverse.

It is also a further objective of the present disclosure to provide an aesthetic camera housing with a camera and camera display where the camera is insertable through a channel defined through the base and mount of the aesthetic camera housing with the camera display being positioned within the interior of the vehicle to provide the driver and passengers with real time information.

Various other objectives and advantages of the present disclosure will become apparent to those skilled in the art as a more detailed description is set forth below.

SUMMARY OF THE INVENTION

The aforesaid and other objectives are realized by providing an aesthetic camera housing including a base and a mount. The base defines a bottom base surface and a rear base surface. The mount defines a top mount surface and a bottom mount surface. The bottom base surface defines one or more bottom fastener holes while the mount defines one or more mount fastener holes. The bottom fastener holes and mount fastener holes are arranged to cooperatively align and receive a fastener therein. The base and mount are configured to join together by inserting one or more fasteners into different one or more mount fastener holes and through different one or more base fastener holes. When the base and mount are fastened together the top surface of the mount and the bottom base surface of the base are flush. The mount further defines a mount camera hole while the base further defines a camera channel, rear opening, and bottom opening. Said rear opening, bottom opening and camera channel are connected within the base and are in fluid communication therewith. The mount camera hole, camera channel, bottom opening, and rear opening are sized and shaped to receive a camera and wiring. When the base and mount are fastened to one another, the mount camera hole, camera channel, bottom opening, and rear opening are connected and in fluid communication. The mount further defines an LED hole. The LED hole is sized and shaped to receive and retain an LED and associated wiring. The bottom mount surface is sized and shaped to embrace, and be flush with, the exterior surface of an automobile. The mount is formed from a solid, transparent material, preferably glass, so that the light emitted from a LED retained within the LED hole penetrates one or more sides of the mount to increase aesthetic appeal of the aesthetic camera housing. The one or more sides of the mount includes integrally formed surface features that reflect and refract the light emitted from the LED to further increase the aesthetic appeal of the aesthetic camera housing. The base further includes an aesthetically pleasing feature that is sized and shaped to increase the aesthetic appeal of the aesthetic camera housing.

DETAILED DESCRIPTION OF THE PREFERRED EMBODIMENT AND OPERATION OF THE INVENTION

Figure 1:
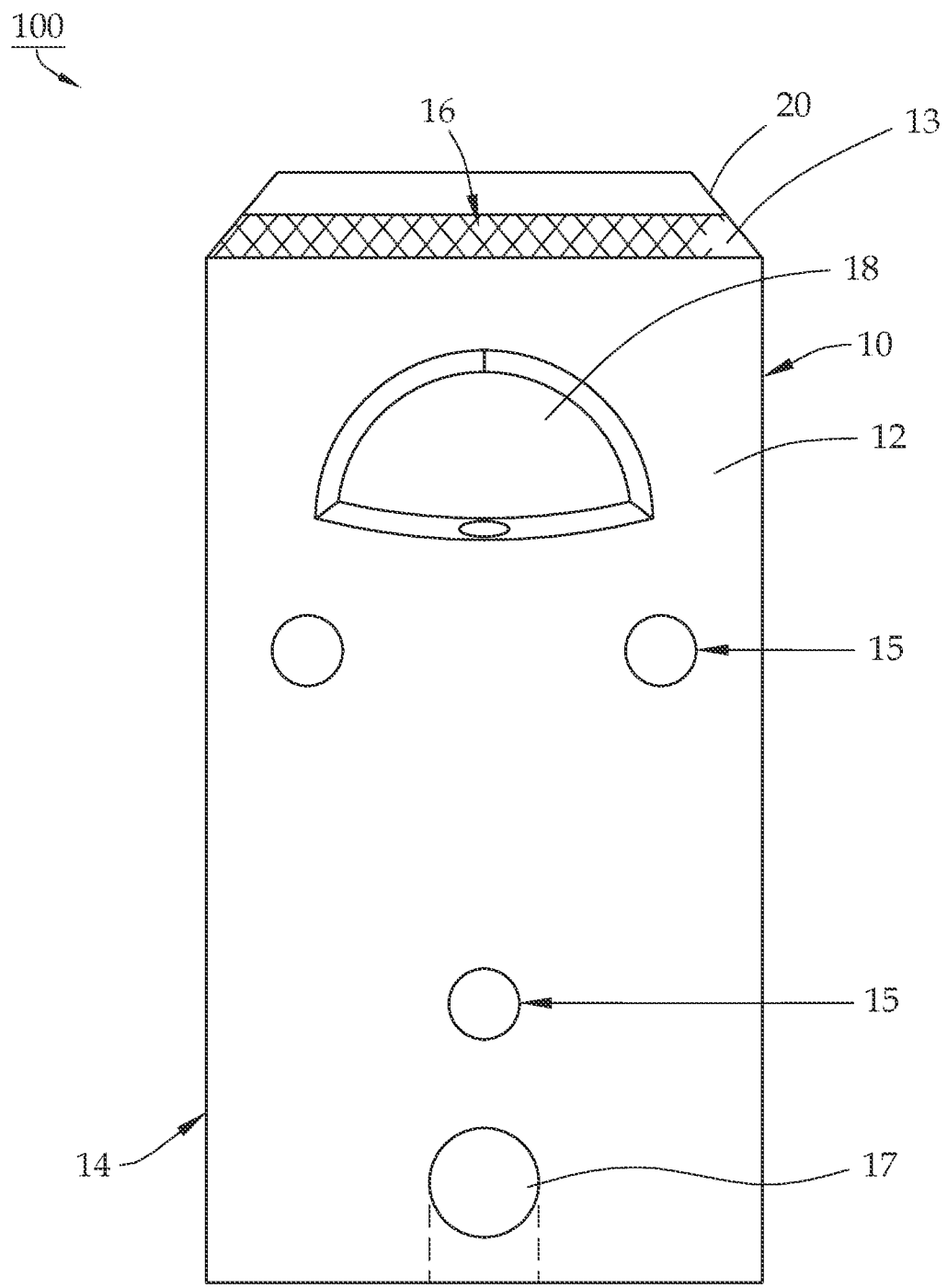
FIG. 1 shows a bottom plan view of the aesthetic camera housing with dotted lines showing the camera holes of the mount and the base.

Various exemplary embodiments of the present disclosure are described below. Use of the term "exemplary" means illustrative or by way of example only, and any reference herein to "the disclosure" is not intended to restrict or limit the disclosure to exact features or step of any one or more of the exemplary embodiments disclosed in the present specification. References to "exemplary embodiment", "one embodiment", "an embodiment", "various embodiments", and the like may indicate that the embodiment(s) of the disclosure so described may include a particular feature, structure, or characteristic, but not every embodiment necessarily incudes the particular feature, structure, or characteristic. Further, repeated use of the phrase "in one embodiment", "in an exemplary embodiment", or "in an alternative embodiment" do not necessarily refer to the same embodiment, although they may.

It is also noted that terms like "preferably", "commonly", and "typically" are not utilized herein to limit the scope of the disclosure or to imply that certain features are critical, essential, or even important to the structure or function of the disclosure. Rather, these terms are merely intended to highlight alternative or additional features that may or may not be utilized in a particular embodiment of the present disclosure.

The present disclosure is described more fully hereinafter with reference to the accompanying figures, in which one or more exemplary embodiments of the disclosure are shown. Like numbers used herein refer to like elements throughout. The disclosure may, however, be embodied in many different forms and should not be construed as limited to the embodiments set forth herein; rather, these embodiments are provided so that this disclosure will be operative, enabling, and complete. Accordingly, the particular arrangements disclosed are meant to be illustrative only and not limited as to the scope of the disclosure, and any and all equivalents thereof. Moreover, many embodiments such as adaptations, variations, modifications, and equivalent arrangements will be implicitly disclosed by the embodiments described herein and fall within the scope of the instant disclosure.

Although specific terms are employed herein, they are used in a generic and descriptive sense only and not for the purposes of limitation. Unless otherwise expressly defined herein, such terms are intended to be given their broad, ordinary, and customary meaning not inconsistent with that applicable in the relevant industry and without restriction to any specific embodiment hereinafter described. As used herein, the article "a" is intended to include one or more items. Where only one item is intended, the terms "one and only one", "single", or similar language is used. When used herein to join a list of items, the term "or" denotes at least one of the items but does not exclude a plurality of items of the list.

For exemplary methods or processes of the disclosure, the sequence and/or arrangement of steps described herein are illustrative and not restrictive. Accordingly, it should be understood that, although steps of various processes or methods may be shown and described as being in a sequence or temporal arrangement, the steps of any such processes or methods are not limited to being carried out in any particular sequence or arrangement, absent an indication otherwise. Indeed, the steps in such processes or methods generally may be carried out in various different sequences and arrangements while still falling within the scope of the present disclosure.

Additionally, any references to advantages, benefits, unexpected results, or operability of the present disclosure are not intended as an affirmation that the disclosure has previously been reduced to practice or that any testing has been performed. Likewise, unless stated otherwise, use of verbs in the past tense (present perfect or preterit) is not intended to indicate or imply that the disclosure has previously been reduced to practice or that any testing has been performed.

As used herein, "holes" may be either blind holes or through holes. In some embodiments, a combination of blind holes and through holes may be utilized.

For a better understanding of the disclosure and its operation, turning now to the drawings, FIGS. 1-8 show various views of aesthetic camera housing 100 assembled, unassembled, and with an aesthetically pleasing feature attached thereto. FIG. 1 illustrates a bottom plan view of the bottom mount surface 12 of the mount 10. The mount 10 defines one or more mount fastener holes 15. The one or more mount fastener holes 15 are sized and shaped to receive a fastener, such as (but not limited to) a bolt. The mount 10 further defines a LED hole 18 that is configured to receive an LED and/or wiring therein. The mount 10 defines a mount camera hole 17 that is configured (i.e. sized, shaped, and otherwise intended) to receive a video camera and/or wiring therein.

In the preferred embodiment, the mount 10 defines three mount fastener holes 15. Three points of attachment to the exterior of the vehicle increases stability and reduces the vibration experienced by the preferred embodiment of aesthetic camera house 100. Reducing vibration is advantageous because it produces a clearer, more stable image. The one or more mount fastener holes 15, mount camera hole 17, and LED hole 18 extend from the top mount surface 11 (shown in FIG. 2) to bottom mount surface 12. In one or more embodiments, the mount 10 is formed from a solid, substantially transparent material, and preferably formed from glass and more preferably half (½) inch thick glass. The bottom mount surface 12 of the mount 10 is sized and shaped to embrace, and be substantially flush with, the surface features of an exterior or interior of a predetermined vehicle (meaning that other than incidental manufacturing variance of the exterior surface of the vehicle, the bottom mount surface 12 and the exterior surface of the vehicle embrace one another). In some embodiments, the mount 10 is formed from a deformable, substantially transparent material that partially deforms to embrace, and be flush with, the surface features of the exterior or interior of a predetermined vehicle. In some embodiments, the bottom mount surface 12 either instead of or in addition to the one or more fastener holes 15, includes an adhesive configured to attach the aesthetic camera housing 100 to a surface of a vehicle.

Figure 4:
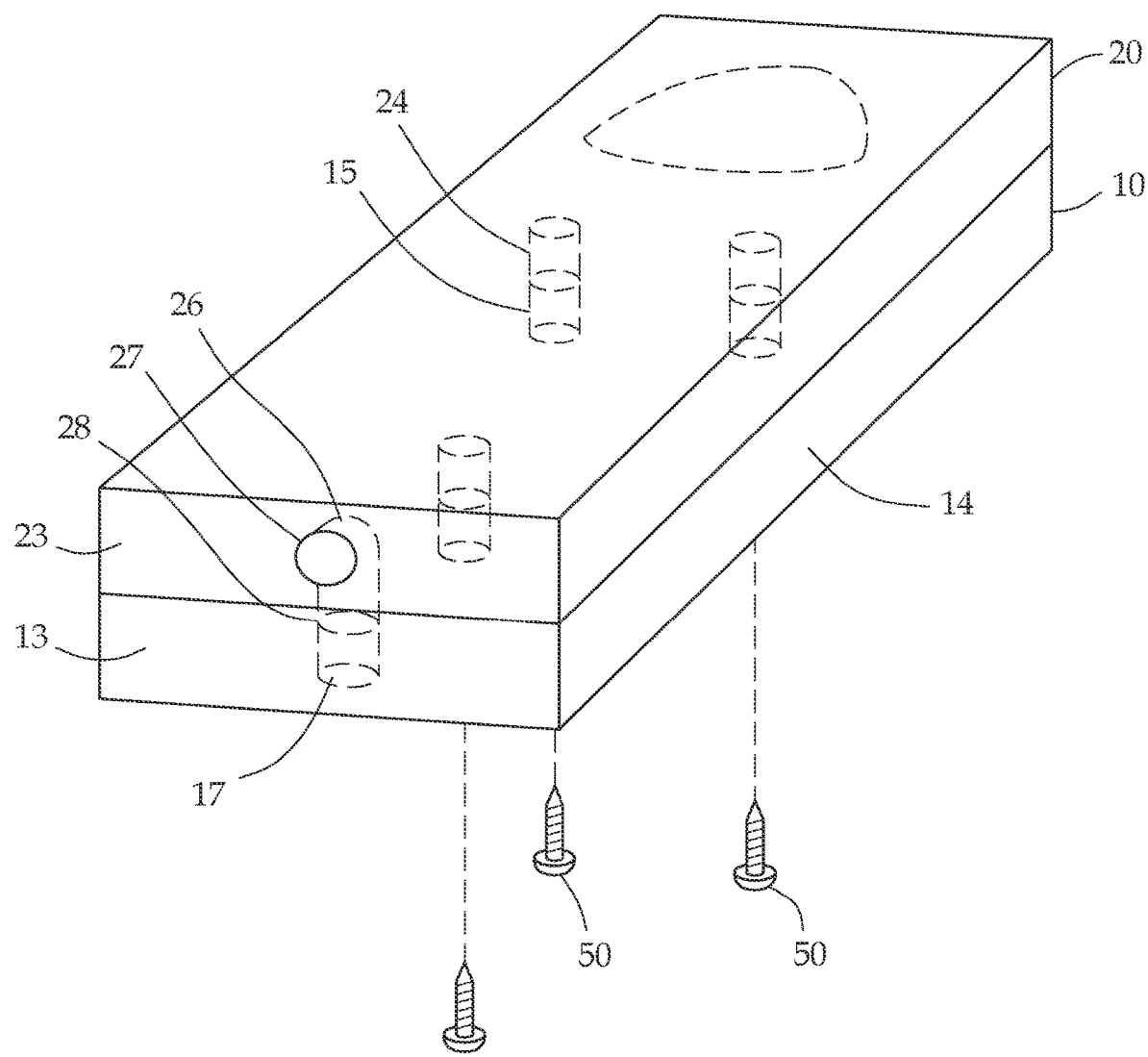
FIG. 4 illustrates a perspective view of the aesthetic camera housing of FIG. 1 with dotted lines showing the camera holes and fastener holes of the mount and base, and the LED hole of the mount.
Figure 5:
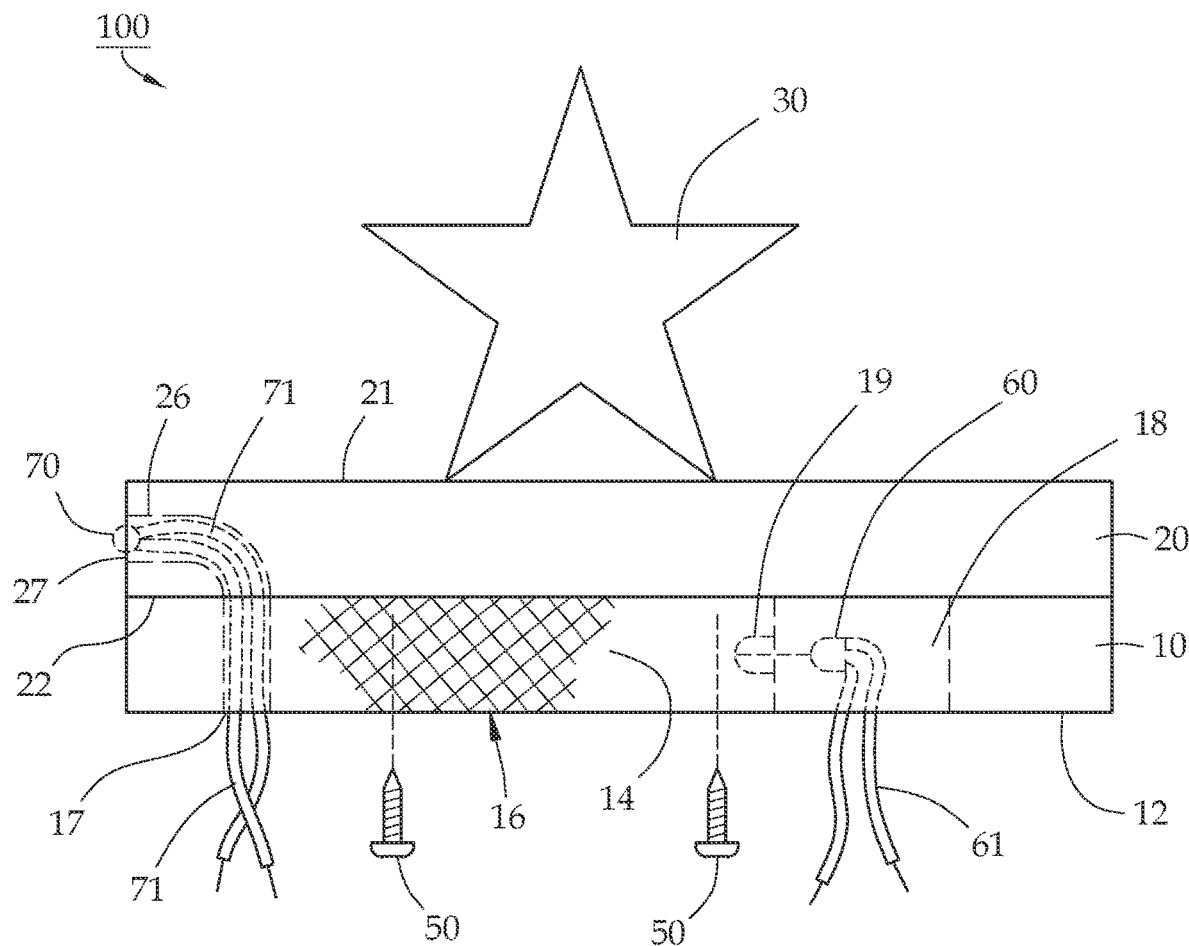
FIG. 5 shows a side view of the aesthetic camera housing of FIG. 1.

In the preferred embodiment, said mount 10 includes an electromagnetic radiation emitter 60, more preferably an LED 60, that is retained in the LED hole 18 as demonstrated in FIG. 5. In some embodiments, the mount 10 defines an opening 19 that can be sized and shaped to receive a bulb of an LED. The opening 19 is in fluid communication with the LED hole 18. The mount 10 defines one or more lateral side surfaces 13 and one or more longitudinal side surfaces 14 as seen in FIG. 4. The one or more lateral side surfaces 13 and/or one or more longitudinal side surfaces 14 include surface features 16 (shown in FIG. 5) that facilitate an aesthetically pleasing display by reflecting and/or refracting the light emitted from the LED 60, that is retained in LED hole 18, through the one or more lateral side surfaces 13 and/or the one or more longitudinal side surfaces 14. The light emitted from the LED 60 indicates to the driver and passengers that the aesthetic camera housing 100 is electrically connected to an electrical power source (not shown) of a vehicle. In some embodiments, the LED 60 indicates to observers that the vehicle is performing a task, such as but not limited to driving in reverse or making a turn. In some embodiments, the surface features 16 are integrally formed and may be formed by etching the one or more lateral side surfaces 13 and/or one or more longitudinal side surfaces 14, but in alternative embodiments, the surface features 16 can also be formed by overlaying material over the one or more lateral side surfaces 13 and/or one or more longitudinal side surfaces 14.

Figure 2:
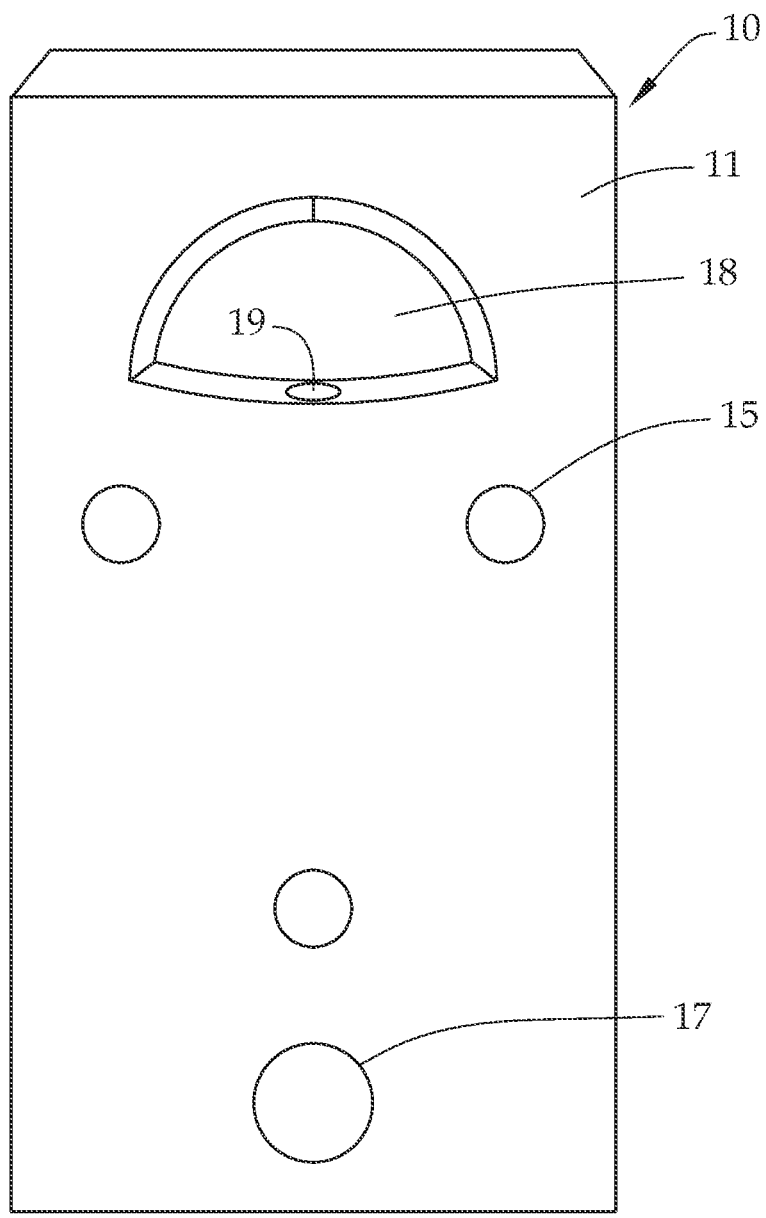
FIG. 2 depicts a top view of the mount of the aesthetic camera housing of FIG. 1.
Figure 3:
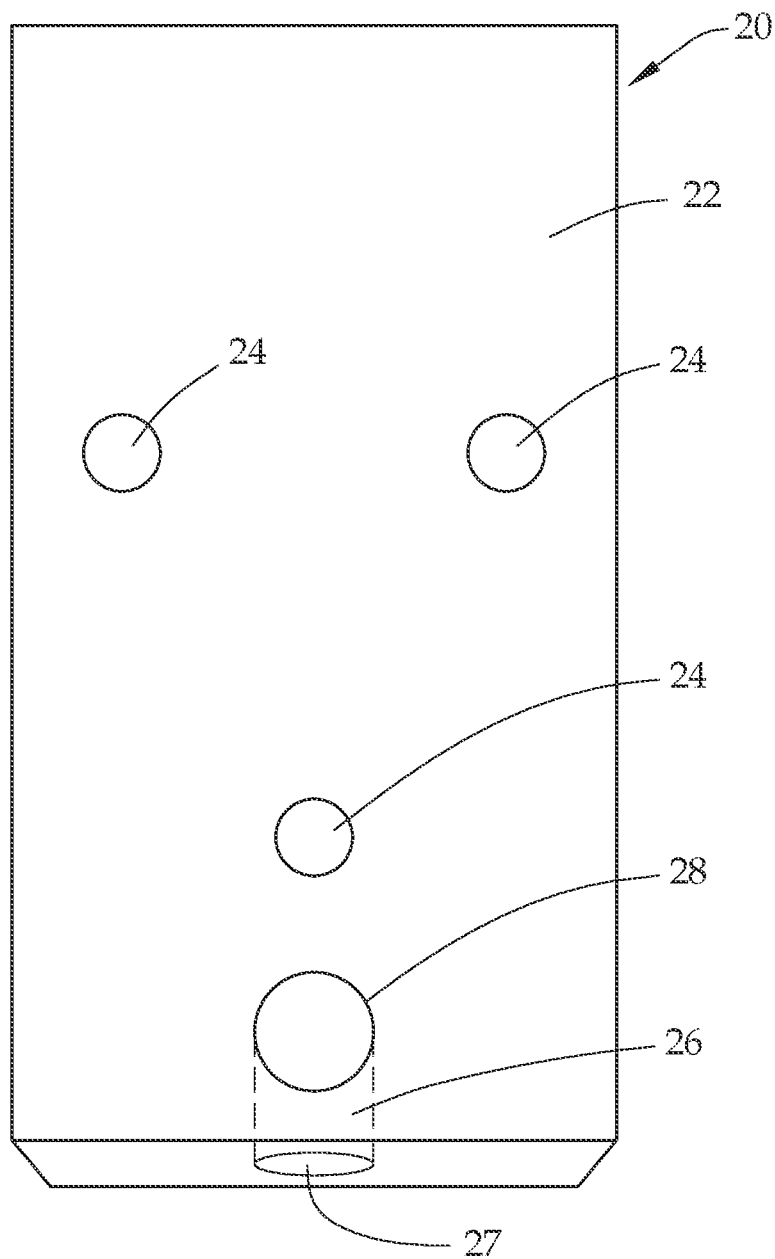
FIG. 3 illustrates a bottom view of the base of the aesthetic camera housing of FIG. 1 with dotted lines showing the camera holes of the base.

FIG. 2 shows a top view of the top mount surface 11 of mount 10. The top mount surface 11 is flush with the bottom base surface 22 (seen in FIG. 3) of base 20. In the preferred embodiment, the one or more mount fastener holes 15, mount camera hole 17, and LED hole 18 are defined from the bottom mount surface 12 (shown in FIG. 1) through the top mount surface 11. FIG. 3 demonstrates a bottom view of the bottom base surface 22 of base 20. The bottom base surface 22 defines one or more base fastener holes 24. The one or more base fastener holes 24 are sized and shaped to receive a fastener, such as (but not limited to) a bolt. The base 20 defines a bottom base surface 22 and a rear base surface 23. The base 20 further defines camera channel 26 with two openings 27, 28 sized and shaped to receive a camera and/or wiring. The base 20 defines a rear opening 27 positioned at the rear base surface 23 (FIG. 4) and defines a bottom opening 28 positioned at the bottom base surface 22 (FIG. 3). Said openings 27, 28 are sized and shaped to receive a camera and associated wiring therein. The rear opening 27 and bottom opening 28 are in fluid communication with one another. The base 20 is configured so that a camera with wiring entail is insertable through the camera channel 26.

In the preferred embodiment, the bottom base surface 22 defines three base fastener holes 24 and more preferably the bottom base surface 22 defines a number of base fastener holes 24 equal to the number of mount fastener holes 15 (shown in FIGS. 2 and 4). In some embodiments, the top mount surface 11 and bottom base surface 22 include, in addition to or in replacement of the fastener holes 15, 24, an adhesive material that attaches or permanently affixes the top mount surface 11 and bottom base surface 22 to one another. In other embodiments, aesthetic camera housing 100 includes an accessory for attaching or affixing the top mount surface 11 to the bottom base surface 22, in addition to or in replacement of the fastener holes 15, 24, that is selected from a group consisting of: a fastener, an adhesive, a resin, a binder, or combinations thereof. In other embodiments, the top mount surface 11 and bottom base surface 22 may include a protrusion and a corresponding hole (each not shown) configured and positioned to receive said protrusion to provide additional structural support to the aesthetic camera housing 100.

Now referring to FIG. 4, shown is a perspective view of the preferred embodiment of aesthetic camera housing 100 demonstrating the mount 10 and base 20 joined together. The bottom base surface 22 of base 20 and the top mount surface 11 of mount 10 define substantially the same size and shape such that the bottom base surface 22 and the top mount surface 11 have substantially similar peripheries. The mount 10 and base 20 are configured to be fastened to one another by inserting one or more fasteners 50 into different ones of the one or more mount fastener holes 15 and through different ones of the one or more base fastener holes 24. The one or more mount fastener holes 15 cooperatively align with the one or more base fastener holes 24. Tightening the one or more fasteners 50 frictionally joins the mount 10 to base 20.

In the preferred embodiment, the aesthetic camera housing 100 includes a camera 70, and more preferably a camera 70 with wiring 71 attached to a monitor (not shown) to display the video feed captured by the camera 70. The mount 10 is preferably formed from a material that dampens vibration so that the video image quality of the camera 70 is increased. The aesthetic camera housing 100 is preferably tightly fastened to a surface of a vehicle to reduce vibration so that the video image quality of the camera 70 is increased. The camera 70 and monitor are configured to be electrically coupled with the electrical power source (not shown) of a vehicle. In one or more embodiments, the camera 70 includes wiring 71, said wiring 71 electrically coupled with the electrical power source of the vehicle (not shown) and electrically coupled with a computing device (not shown) that may control the on/off state of the camera 70, the zoom of the camera 70, storage of video data captured by the camera 70, and the angle that the camera 70 is facing toward. In alternative embodiments, the wiring 71 is electrically coupled with the electrical power source of the vehicle and a separate electrical power source (not shown). When the mount 10 and base 20 are fastened to one another, the mount camera hole 17 and bottom opening 28 are joined, and the mount camera hole 17 is in fluid communication with the bottom opening 28, camera channel 26, and rear opening 27. The mount 10 and base 20 are preferably configured so that wiring 17 of camera 70 would be insertable through rear opening 27 passing through camera channel 26 and exiting through mount cameral hole 17 proximate bottom mount surface 12 as seen in FIG. 5.

FIG. 5 shows a side view of the aesthetic camera housing 100. The base 20 and mount 10 are fastened to one another by inserting one or more fasteners 50. The base bottom surface 22 and mount top surface 11 are configured to be flush with one another when the one or more fasteners 50 are fastened.

In the preferred embodiment, the fastener holes 15 are "through holes" and the base fastener holes 24 are "blind holes" such that they do not go completely through base 20. In some embodiments, the base fastener holes 24 can be "through holes." In other embodiments, the mount fastener holes 15 can be "blind holes." In certain embodiments, the one or more lateral side surfaces 13 and/or the one or more longitudinal side surfaces 14 of mount 10 includes surface features 16 that are configured reflect and/or refract light being emitted from an LED 60 that is positioned and retained within the LED hole 18. In some embodiments, the mount 10 defines an opening 19 that is configured to receive and retain the LED 60 to prevent damage to and breakage of the LED 60 due to jostling and changes in direction of the vehicle. The opening 19 can be in fluid communication with the LED hole 18 so that the opening 19 can receive the LED 60 and the LED hole 18 can receive the wiring 61 of the LED 60. The LED 60 is configured to be electrically coupled with an electrical power source (not shown) of the vehicle, but in alternative embodiments may include its own electrical power source (not shown). In some embodiments, the surface features 16 are formed by etching or scoring one or more surfaces of the one or more lateral side surfaces 13 and/or the one or more longitudinal side surfaces 14 and in other embodiments the surface features 16 are deposited onto the one or more lateral side surfaces 13 and/or the one or more longitudinal side surfaces 14. In one or more embodiments, the LED 60 includes wiring 61, said wiring 61 is configured to be insertable through an opening in the exterior of a vehicle (opening not shown) and electrically coupled with an electrical power source of the vehicle and electrically coupled with a computer (computer and power source not shown) configured to control the color, the light intensity, and the on/off state of the LED.

In the preferred embodiment, the base 20 includes an aesthetically pleasing feature 30 for example as seen in FIG. 5 demonstrating star, however, as would be understood the aesthetically pleasing feature 30 may be formed in a variety of shapes, sizes, and dimensions to increase the aesthetic appeal of the aesthetic camera housing 100. In some embodiments, the base 20 defines a top base surface 21 that is configured to be opposing relation to the bottom base surface 22, the aesthetically pleasing feature 30 can overlay the top base surface 21 and/or be positioned on the top base surface 21. In one or more embodiments, the aesthetically pleasing feature 30 is formed in the shape of a member of the group consisting of: a sting ray, any species of fish, a panther, a jaguar, a lion, any species of feline, a bull, a ram, a stag, any species of ungulate, a mustang, any species of equine, a dog, a wolf, any species of canine, a swan, an eagle, a falcon, a hawk, any species of bird, a snake, any species of reptile, a scorpion, any species of arachnid, any species of insect, a human, any species of mammal, a gryphon, and a phoenix, and combinations thereof. In other embodiments, the aesthetically pleasing feature 30 may be formed in the shape of a member from the group consisting of: a letter of the Latin alphabet, a letter of the Greek alphabet, a trident, a wing, a crown, a watercraft, and a geometric shape and combinations thereof. In preferable embodiments, the aesthetically pleasing feature 30 is formed in the shape of a logo, trademark, or brand known to those skilled in the art in the automobile, watercraft, aviation, vehicle, or transportation industry. It would be understood by those skilled in the art that the more similar or reminiscent in appearance the aesthetically pleasing feature 30 is to logos, trademarks, and brands of the automobile, watercraft, aviation, vehicle or transportation industry, the more aesthetically pleasing the feature 30 would be; therefore it is preferable that the dimensions of the feature 30 are a scaled representation of an existing logo, trademark, or brand or alternatively have the same ratios of spatial dimensions to an existing logo, trademark, shape or brand. Other metrics for quantifying how aesthetically pleasing the feature 30 is includes: the frequency of the golden ratio (1:1.168) present in the dimensions of the aesthetically pleasing feature; or by the fair market value of goodwill associated with the logo, trademark, or brand that the aesthetically pleasing feature 30 is configured to resemble or mimic relative to other logos, trademarks, or brands in the same industry. In some embodiments, the golden ratio appears at least once in the dimensions of the aesthetically pleasing feature 30. It is well known that consumers perceive brands, logos, and trademarks with substantial goodwill as more aesthetically pleasing than brands, logos, and trademarks with lesser goodwill. The aesthetically pleasing feature 30 is more aesthetically pleasing when the fair market value of the goodwill associated with the mimicked logo, trademark, or brand is valued at one million U.S. Dollars or more; preferably the goodwill of the mimicked logo, trademark, or brand is valued at twenty million U.S. Dollars or more; and most preferably fifty million U.S. Dollars or more. A 2010 study conducted by Zanvyl Krieger Mind/Brain Institute at Johns Hopkins University (https://www.smithsonianmag.com/science-nature/do-our-brains-find-certain-shapes-more-attractive-than-others-180947692/) found that humans find curvaceous shapes more aesthetically pleasing than shapes with sharp edges, therefore another metric is by calculating the average roundness and/or sphericity ($\Psi$) of the shape of the aesthetically pleasing feature 30. In some embodiments, the sphericity of the aesthetically pleasing feature of between 0.0001 and 0.9, and more preferably between 0.001 and 0.5, and most preferably between 0.015 and 0.3 as calculated by the following exemplary equation:

$$\Psi = \frac{\pi^{\frac{1}{3}}(6V_p)^{\frac{2}{3}}}{A_p}$$

In the preferred embodiment, the aesthetically pleasing feature 30 is configured to be aerodynamic to reduce drag and vibration of the aesthetic camera housing 100 when the automobile is in use, resulting in a clearer video feed and overall increased performance over the prior art. Vibration is reduced when total drag is reduced, therefore it is preferable to limit total drag. The aesthetic camera housing 100 preferably contributes less than 10% of the total drag of a predetermined automobile, more preferably less than 7%, and most preferably less than 2%. Vibration may also be reduced by securely connecting the aesthetic camera housing 100 to the vehicle. In one or more embodiments, the mount 10 is formed out of a deformable material that dampens vibration resulting in a clearer video feed.

Figure 6:
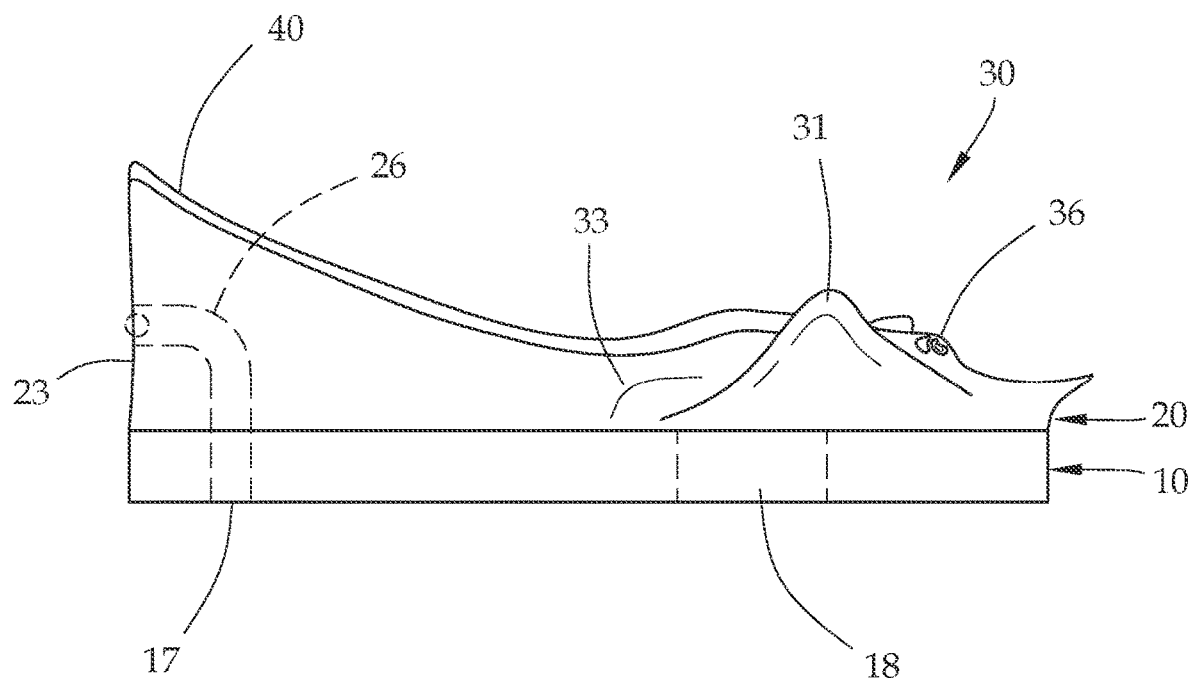
FIG. 6 illustrates a side view of a preferred embodiment of the aesthetic camera housing of FIG. 1 with an aesthetically pleasing feature in the shape of a sting ray.
Figure 7:
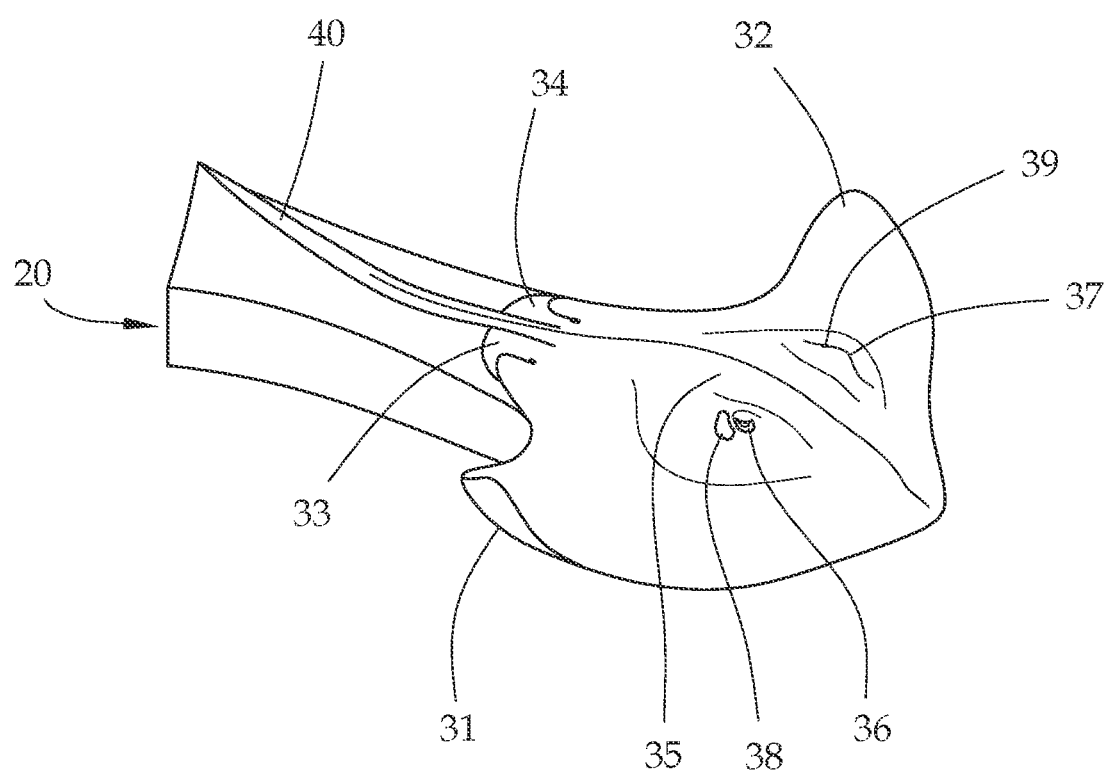
FIG. 7 depicts an elevated plan view of the aesthetic camera housing of FIG. 6.

As seen in FIGS. 6 and 7, in a preferred embodiment, the aesthetically pleasing feature 30 comprises a sting ray having left and right sinusoidal sides 31, 32, left and right substantially planar flanges 33, 34, and a raised disc 35. Said raised disc 35 preferably includes left and right peaks 36, 37, and left and right depressions 38, 39. The aesthetically pleasing feature 30 may further comprises: a middle peak 40 configured to extend along a longitudinal midline of the aesthetically pleasing feature 30 positioned between the left and right sinusoidal sides 31, 32. Said middle peak 40 preferably inclines toward the rear base surface 23 and away from the bottom base surface 22. The most preferred embodiment of the aesthetically pleasing feature 30 is sized and shaped to resemble a sting ray with the sinusoidal sides 31, 32 modeling the pectoral fins, the substantially planar flanges 33, 34 modeling the pelvic fins, the peaks 36, 37 modeling the eyes, the depressions 38, 39 modeling the spiracles, and the middle peak 40 modeling the tail. In a preferred embodiment, the sinusoidal sides 31, 32, substantially planar flanges 33, 34, peaks 36, 37, 40, and depressions 38, 39 are formed and arranged to reduce drag and vibration of the aesthetic camera housing 100 when the automobile is in use, resulting in a clearer video feed and overall increased performance over the prior art. The aesthetic camera housing 100 preferably contributes less than 10% of the total drag of a predetermined automobile, more preferably less than 7%, and most preferably less than 2%.

Figure 8:
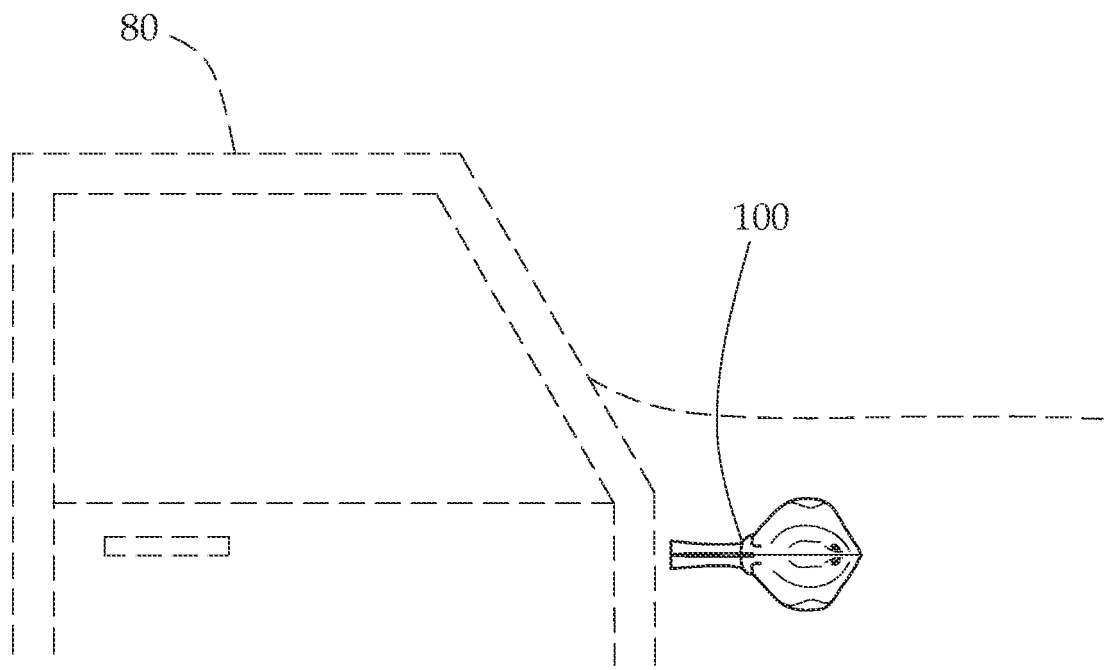
FIG. 8 illustrates the aesthetic camera housing of FIGS. 6 and 7 attached to an automobile.

Now turning to FIG. 8, illustrated is the aesthetic camera housing 100 attached to the exterior surface of a vehicle such as an automobile 80, partially shown in dashed lines. The aesthetic camera housing 100 is configured to be attachable to the exterior of an automobile. The aesthetic camera housing 100 may be oriented to be facing different points of interest in and around the vehicle. For example, the rear base surface 23 from which camera 70 is positioned may be oriented in the direction of the front, rear, underbelly, side, or interior of the vehicle. In one or more embodiments, the aesthetic camera housing 100 includes a member or substance for attaching and/or affixing the bottom mount surface 12 to a surface of a vehicle, said member or substance is selected from a group consisting of: fasteners, adhesives, binders, resins, or welding.

In some embodiments, the rear base surface 23 would be oriented to be facing in the direction of the rear of an automobile while the aesthetic camera housing 100 is attached to the left or right side of the vehicle so that a camera would provide real-time video footage to the driver of the automobile of the condition of the road and the location of other nearby vehicles relative to the automobile that may or may not be in a blind spot from the driver's vantage point. In the preferred embodiment, the rear base surface 23 is configured so that when the aesthetic camera housing 100 is fastened or otherwise affixed to an automobile the rear base surface 23 faces in the direction opposite from the front of the automobile.

Although, the aesthetic camera housing 100 is discussed above to be used primarily in the context of automobiles, the applicability of the aesthetic camera housing 100 is not limited to automobiles. The aesthetic camera housing 100 may be used in connection with any vehicle or transportation device such as, but not limited to, watercrafts, airplanes, motorcycles, and bicycles.

As would be understood while aesthetic camera housing 100 is shown with base 10 and mount 20 formed in a rectangular shape, various shapes and dimensions are contemplated within the disclosure, including forming mount 20 in the shape of the desired aesthetic feature 30, forming and sizing aesthetic feature 30 to fit overtop and frictionally engage mount 20 with or without the use of adhesives or other bonding materials, or forming aesthetic camera housing 100 in one solitary piece. Further while only one LED 60 is shown as would be understood numerous LEDs may be provided, of different colors or different positions to display an array of color combinations while driving which may alternatively transfer to a single color or blinking state when a turn signal of the vehicle is activated or solid white light when reverse is engaged or solid red light when the brakes are engaged.

The illustrations and examples provided herein are for explanatory purposes and are not intended to limit the scope of the appended claims.

I claim:

1. An aesthetic camera housing (100) comprising:
   a base (20) defining a bottom base surface (22) and a rear base surface (23), said base (20) further defining a camera channel (26) that includes a bottom opening (28) positioned on the bottom base surface (22) and a rear opening (27) positioned on the rear base surface (23), said bottom opening (28), rear opening (27), and camera channel (26) in fluid communication with one another,
   said bottom opening (28), rear opening (27), and camera channel (26) configured to receive a camera (70) and/or wiring (71) therein,
   said bottom base surface (22) defining one or more base fastener holes (24),
   a mount (10) defining one or more mount fastener holes (15), a mount camera hole (17), and a LED hole (18) configured to receive a LED light (60) and/or wiring (61) therein, the mount (10) defining one or more longitudinal side surfaces (14) and/or one or more lateral side surfaces (13), wherein at least one of the one or more longitudinal side surfaces (14) or one or more lateral side surfaces (13) include a surface feature (16) configured to refract and/or reflect light emitted from the LED light (60);
   wherein, the one or more base fastener holes (24) and the one or more mount fastener holes (15) are each sized and shaped to receive a fastener (50);
   wherein the base (20) and the mount (10) are configured to be fastened to one another by inserting one or more fasteners (50) through different ones of the one or more base fastener holes (24) and different ones of the one or more mount fastener holes (15); and wherein the bottom base surface (22) and a top mount surface (11) define substantially the same size and shape.

2. The aesthetic camera housing (100) of claim 1, wherein said base (20) further includes an aesthetically pleasing feature (30), said aesthetically pleasing feature (30) comprising:
a left sinusoidal side (31) and a right sinusoidal side (32),
a raised disc (35), said raised disc (35) including a left peak (36) and a right peak (37) formed to resemble eyes, and
a middle peak (40) extending along a longitudinal midline of the base (20) inclining toward the rear base surface (23) and away from the bottom base surface (22).

3. The aesthetic camera housing (100) of claim 1, wherein said base (20) further includes an aesthetically pleasing feature (30) defining one or more shapes, sizes, and dimensions to increase the aesthetic appeal of the aesthetic camera housing and reduce drag and vibration of the aesthetic camera housing.

4. The aesthetic camera housing (100) of claim 3, wherein the base (20) is formed in the shape of a sting ray.

5. The aesthetic camera housing (100) of claim 3, wherein the base (20) is formed in the shape of a geometric shape.

6. The aesthetic camera housing (100) of claim 1, wherein the mount (10) is formed from a solid, transparent material.

7. The aesthetic camera housing (100) of claim 6, wherein the mount (10) is formed from glass.

8. The aesthetic camera housing (100) of claim 7, wherein the mount (10) further comprises an electromagnetic radiation emitter (60) and wiring (61), said electromagnetic radiation emitter (60) and wiring (61) are configured to be insertable through the LED hole (18).

9. The aesthetic camera housing (100) of claim 8, wherein the electromagnetic radiation emitter (60) is defined as a light-emitting diode (LED).

10. The aesthetic camera housing (100) of claim 1, wherein the mount (10) is configured to embrace and be flush with an exterior of a predetermined automobile.

11. An aesthetic camera housing (100) comprising:
a base (20) defining a bottom base surface (22) and a rear base surface (23), said base (20) further defining a camera channel (26) including a bottom opening (28) positioned on the bottom base surface (22) and a rear opening (27) positioned on the rear base surface (23), said bottom opening (28), rear opening (27), and camera channel (26) in fluid communication with one another,
said bottom opening (28), rear opening (27), and camera channel (26) each configured to receive a camera (70) and/or wiring (71),
said mount (10) including a member for attaching and/or affixing the aesthetic camera housing (100) to a surface, a mount camera hole (17), and a LED hole (18) configured to receive a LED light (60) and/or wiring (61), the mount (10) defining one or more longitudinal side surfaces (14) and/or one or more lateral side surfaces (13), wherein at least one of the one or more longitudinal side surfaces (14) or one or more lateral side surfaces (13) include a surface feature (16) configured to refract and/or reflect light emitted from the LED light (60);
wherein the bottom base surface (22) and top mount surface (11) are configured to embrace and be flush with one another;
wherein the bottom base surface (22) and top mount surface (11) are configured to be substantially the same size and shape;
wherein the bottom base surface (22) and top mount surface (11) are configured so that when embraced and flush, the mount camera hole (17), camera channel (26), bottom opening (28), and rear opening (27) are in fluid communication.

12. The aesthetic camera housing (100) of claim 11, further comprising a camera (70) that is positioned within the camera channel (26).

13. The aesthetic camera housing (100) of claim 12, further comprising an LED (60) that is positioned within the LED hole (18).

14. The aesthetic camera housing (100) of claim 13, wherein said base (20) further includes an aesthetically pleasing feature (30); said aesthetically pleasing feature (30) comprising:
a left sinusoidal side (31) and a right sinusoidal side (32),
a raised disc (35), said raised disc (35) including a left peak (36) and a right peak (37) formed to resemble eyes, and
a middle peak (40) extending along a longitudinal midline of the base (20) inclining toward the rear base surface (23) and away from the bottom base surface (22).

15. The aesthetic camera housing (100) of claim 14, wherein the mount (10) is formed from a solid, transparent material and the member for attaching and/or affixing the aesthetic camera housing (100) is selected from a group consisting of: a fastener, an adhesive, a resin, a binder, welding, or combination thereof.

16. The aesthetic camera housing (100) of claim 14, further comprising a member for attaching and/or affixing the bottom base surface (22) and top mount surface (11) to one another, said member selected from a group consisting of: a fastener, an adhesive, a resin, a binder, or combination thereof.

* * * * *